US006421716B1

(12) United States Patent
Eldridge et al.

(10) Patent No.: US 6,421,716 B1
(45) Date of Patent: Jul. 16, 2002

(54) SYSTEM FOR GENERATING CONTEXT-SENSITIVE HIERARCHICALLY ORDERED DOCUMENT SERVICE MENUS

(75) Inventors: Margery A. Eldridge, Great Shelford; Michael J. Flynn, Milton; Christopher M. Jones, Trumpington; Michiel F. E. Kleyn, London; Michael G. Lamming, Cambridge; David L. Pendlebury, Wigan Lancs, all of (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/270,641

(22) Filed: Mar. 16, 1999

(30) Foreign Application Priority Data

Sep. 30, 1998 (GB) .............................. 9821102

(51) Int. Cl.[7] .............................. G06F 15/16
(52) U.S. Cl. ................. 709/219; 709/232; 709/203; 709/238; 455/433
(58) Field of Search ................. 709/219, 225, 709/206, 226, 249; 707/10; 455/422, 435, 436, 433

(56) References Cited

U.S. PATENT DOCUMENTS

| 5,555,376 A |   | 9/1996 | Theimer et al. ....... 395/200.09 |
| 5,822,539 A | * | 10/1998 | Van Hoff .................... 709/200 |
| 5,848,415 A | * | 12/1998 | Guck ........................ 707/10 |
| 5,862,321 A | * | 1/1999 | Lamming et al. ........... 709/200 |
| 5,870,089 A | * | 2/1999 | Fabbio et al. .............. 345/335 |
| 6,047,327 A | * | 4/2000 | Tso et al. ................... 709/232 |
| 6,115,754 A | * | 8/2000 | Landgren .................... 709/249 |
| 6,119,155 A | * | 9/2000 | Rossmann et al. .......... 709/219 |
| 6,201,611 B1 | * | 3/2001 | Carter et al. ................ 358/1.15 |
| 6,256,498 B1 | * | 7/2001 | Ludwig ...................... 455/433 |
| 2002/0004817 A1 | * | 1/2002 | Pham et al. ................ 709/219 |

FOREIGN PATENT DOCUMENTS

| EP | 0 691 619 A2 | 1/1996 |
| GB | 2 296 115 A | 6/1996 |

OTHER PUBLICATIONS

Schilit, Bill et al., "Context–Aware Computing Applications", published in Proceedings Workshop on Mobile Computing Systems and Applications, IEEE, Dec. 1994, and in Technical Report CSL–94–12, Xerox Palo Alto Research Center, Nov. 1994.

(List continued on next page.)

Primary Examiner—Ario Etienne
Assistant Examiner—Kimberly Flynn

(57) ABSTRACT

A system for performing document services using mobile computing devices provides users of the system with document references that can be transmitted over integrated wireless and wire-based communication services. The system includes workstations, files servers, printers and other devices coupled to a wire-based network. Mobile computing devices are coupled to the wire-based network through either IR (infrared) or RF (radio) transceiver gateways. Each mobile computing device appears to hold a user's personal collection of documents by being programmed to receive, transmit, and store document tokens. A user interface at the mobile computing devices provide users with means for fast and easy access to document services that are proximate to where they are physically located. Through the user interface, a user queries a document device proximate to their physical location. Responsive to the query, a hierarchical list of available services is displayed at the user interface. The hierarchical list provides the user with immediate access to the queried document device, as well as links to other document devices that are ordered in a location and class specific hierarchy.

20 Claims, 11 Drawing Sheets

OTHER PUBLICATIONS

U.S. Patent Application Serial No. 09/118,221 entitled "Token–Based Document Transaction System" to Margery A. Eldridge et al., filed Jul. 17, 1998.

U.S. Patent Application Ser. No. 09/118,322 entitled "Token–Based Document Transactions" to Margery A. Eldridge et al., filed on Jul. 17, 1998.

U.S. Patent Application Ser. No. 09/118,598 entitled "Context–Sensitive Document Transactions" to Margery A. Eldridge et al., filed Jul. 17, 1998.

Want, Roy et al., "The PARCTAB Ubiquitous Computing Experiment," published in Technical Report CSL–95–1, Xerox Palo Alto Research Center, Mar. 1995 and in IEEE Personal Communications, Dec. 1995,.

* cited by examiner

SYSTEM FOR GENERATING CONTEXT-SENSITIVE HIERARCHICALLY ORDERED DOCUMENT SERVICE MENUS

CROSS-REFERENCE TO RELATED APPLICATIONS

Cross-reference is made to U.S. patent application Ser. Nos. 09/270,320, entitled "Secure Token-Based Document Server", Ser. No. 09/270,451, entitled "Mobile Email Document Transaction Service", and Ser. No. 09/270,645, entitled "Mobile Document Paging Service", which are all assigned to the same assignee as the present invention and hereby incorporated by reference.

BACKGROUND OF THE INVENTION

1. Field of the Invention

The present invention relates generally to a system for performing document services using mobile computing devices, and more particularly, to a system for providing users of mobile computing devices with context sensitive hierarchically ordered service menus.

2. Description of Related Art

While the use of mobile computing devices is becoming more prevalent among mobile workers, transfer of document information between mobile computing devices is often limited due to inadequate storage capacity on such devices or due to inadequate communication channel bandwidth. To overcome these limitations, many mobile workers carry a laptop computer with them while traveling. Although laptop computers are increasingly smaller and lighter, their functionality, which is designed to meet the requirements of office-based document work, is determined largely by the desktop machines from which they evolved. Powerful editors and spreadsheet applications, for example, that are essential in certain office-based work environments have limited utility while away from the office. In some circumstances, mobile workers carry laptop computers simply to be able to access their documents, and not necessarily to create or edit them.

One mobile document transaction service for overcoming these limitations is disclosed in U.S. Pat. No. 5,862,321 (also published in European Patent Application EP 691,619 A2). More specifically, U.S. Pat. No. 5,862,321 (entitled: "System and Method for Accessing and Distributing Electronic Documents") discloses a system for transferring between computers document identifiers that represent a particular document, rather than the document itself. This system can include any number of workstations, file servers, printers and other fixed devices (including multifunction devices) coupled to a network, as well as a number of mobile computing devices carried by users and coupled to the network by an infrared (IR) or radio (RF) link. Each mobile computing device appears to hold a user's personal collection of documents, with the devices being programmed to receive, transmit, and store document identifiers (e.g., a URL - "Uniform Resource Locator") or document tokens, as defined herein.

Each document token is associated with an electronic document stored in an electronic repository or database. The mobile document transaction service effectively distributes references to documents between mobile computing devices by transmission of document tokens, rather than the documents themselves. For example, a document can be sent to an IR transceiver equipped network printer by "beaming" a document token, which references the document, from a mobile computing device to the network printer. The network printer retrieves the complete document referenced by the document token, and immediately prints a copy of the document. Thus, to a user of the mobile document transaction service, documents are seamlessly passed between users and output or input to devices coupled to networks as expansive as the Internet. Since the document references are small and defined, the documents that they reference can have an arbitrary size and not impact the performance of the mobile computing devices. Advantageously, token based document references can be passed between two mobile computing devices without having to transmit large amounts of data.

A user of a mobile document transaction service often needs to know about and use document devices and services when in unfamiliar surroundings. For example, users of the mobile document transaction service who travel to a new location need to make use of available document devices and services (e.g., printers). Currently, a user must be aware of the name, whereabouts and capabilities of a given device or service to be able to use it over a network. Generally, unless a user is specifically aware of a document service available on a network, the user must potentially navigate through a series of links to first locate a device and then access the document service that it provides. It would be advantageous, therefore, to provide a user interface that offers users of the mobile document transaction service, fast and easy access to document services that are proximate to the location at which the users are physically situated.

SUMMARY OF THE INVENTION

In accordance with the invention there is provided a method and apparatus therefor, for operating a system of token-aware document services. The system includes a token-enabled server that records a database of document tokens. The token-enabled server is coupled to a network of file servers for storing the documents referenced by the document tokens. Each document token identifies a location of a document stored on the network. The token-enabled server receives, from a mobile computing device, a request for available document services for performing with document tokens. In addition, the token-enabled server receives, with the request for available document services received from the mobile computing device, a context identifier for providing an indication of physical location. The context identifier specifies a physical location from which the request for document services is transmitted by the mobile computing device.

In accordance with one aspect of the invention, the token-enabled server develops a hierarchically ordered list of available document services using the context identifier. The context identifier is associated with a unique document device coupled to the network. The hierarchically ordered list provides two levels of access to document services available for document tokens. The first level of access provides immediate access to perform a document service available at the unique document device. The second level of access provides indirect access to additional document services that are available at other document devices. Once developed, the token-enable server transmits the hierarchically ordered list of available document services to the mobile computing device.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. Operating Environment

Figure 1:
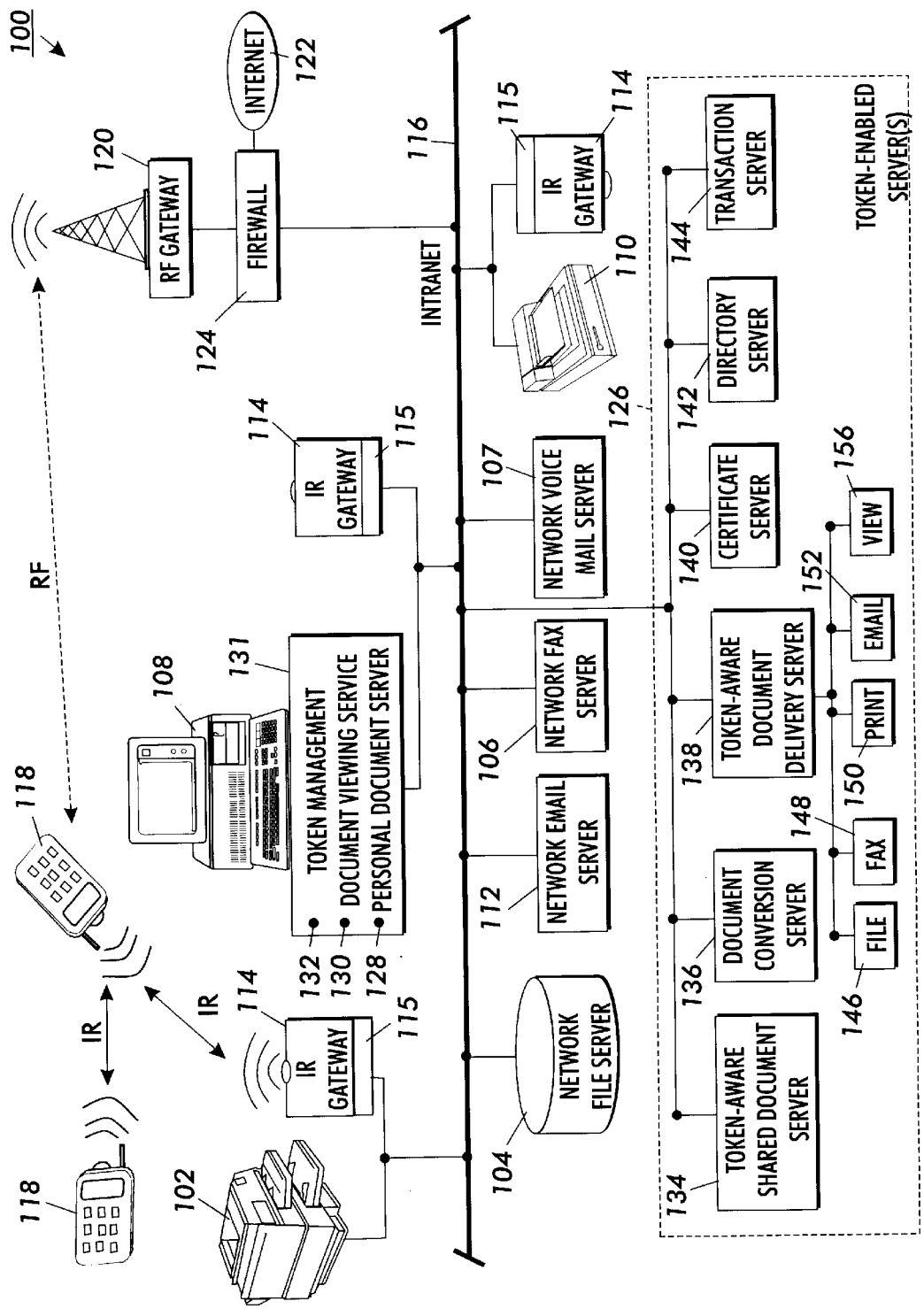
FIG. 1 illustrates a distributed operating environment for performing the present invention.

Referring now to the drawings where the showings are for the purpose of describing the invention, FIG. 1 illustrates a distributed operating environment 100 for performing the present invention. The distributed operating environment includes a plurality of network devices for providing document services. The network devices, which are coupled to wire-based networks 116 and 122, include a printer 102, a file server 104, a network fax server 106, a network voice mail server 107, a personal workstation 108, a scanner 110, and a network email server 112. Generally, these as well as other network devices not shown, communicate using Intranet 116 and gain access to Internet 122 through firewall 124. The network devices communicate over the wire-based networks 116 and 122 using well-known network communication protocols such as TCP/IP.

In addition, FIG. 1 shows mobile computing devices 118. The mobile computing devices 118 are bridged to the wire-based networks 116 and 122 through either IR gateways 114 or RF gateway 120. Such mobile computing devices communicate with each other or other wire-based or wireless devices using either an IR (Infrared) or a radio (RF) transceiver. An example of such a mobile computing device is the Nokia© 9000 Communicator, which is sold by the Nokia Company. The RF transceiver operates over any suitable wireless network such as PCS, GSM, or pager messaging. The IR transceiver uses, for example, communication standards set by the infrared data association (IRDA).

To seamlessly integrate document services across wireless and wire-based networks, the wire-based network is further populated with token-enabled server(s) 126, personal token-enabled workstation elements 131, and IR gateway context insertion slivers 115. These elements operate together in the distributed operating environment to provide users of the mobile computing device 118 with streamlined access to document services available on wire-based networks 116 and 122. Users of token-enabled mobile computing devices 118 are capable of browsing through directories of document tokens. These document tokens represent a users documents stored on wired-based networks 116 or 122. In addition using token-enabled mobile computing devices, the user is able to apply document services available on networks 116 or 122 to selected document tokens.

Token-enabled mobile computing devices are further described in the following patent applications, which are hereby incorporated by reference: U.S. Pat. No. 5,862,321 (entitled: "System and Method for Accessing and Distributing Electronic Documents"), U.S. patent application Ser. No. 09/118,598 (entitled: "Context-Sensitive Document Transactions"), U.S. patent application Ser. No. 09/118,322 (entitled: "Token-Based Document Transactions") and U.S. patent application Ser. No. 09/118,221 (entitled: "Token-Based Document Transaction Systems"). In addition, further background information relating to network protocols is disclosed by Tanenbaum in "Computer Networks," ISBN 0-13-349945-6.

B. Token-Enabled Server

The token-enabled server 126, which operates on the wire-based networks 116 and 122, communicates with network devices indicated by reference numbers 102, 104, 106, 107, 108, 110, and 112, as well as, the RF and IR gateways 114 and 120. The token-enabled server 126 includes token-aware services or servers 134, 136, 138, 140, 142, and 144. These token-aware services can either be operating centrally on token-enabled server 126 or individually on servers distributed over Intranet 116 or Internet 122. The services provided by the token-enabled server(s) 126 are shared between a plurality of users of the mobile computing devices 118.

Transmissions from the mobile computing device 118 are routed through one of the gateways 114 or 120 to transaction server 144. The transaction server 144 is adapted to manage transaction requests from mobile computing devices 118 that involve requests for document services available on networks 116 and 122. The directory server 142 maintains a database of token-enabled devices (e.g., printer 102 and scanner 110). The transaction server 144 communicates with the directory server 142 to look up parameters for satisfying document delivery requests from the mobile computing devices 118. For example, the directory server contains information that relates a particular IR transceiver 114 to its associated network device such as printer 102.

In addition, the transaction server 144 communicates with the token-aware document delivery servers 138 and 128. The token-aware document delivery servers 138 and 128 accept document tokens and retrieve the document that the token represents. Document tokens reference documents stored on the token-aware shared document server 134, the token-aware personal document server 128, or other file servers located on the Intranet 116 and the Internet 122 (e.g., network file server 104). Effectively, any mobile computing device 118 can communicate either directly or indirectly with the token-aware document servers 134 and 128.

One purpose of the token-aware document servers 134 and 128 is to function as an interface between token-enabled devices and services and non-token enabled file servers. That is, the token-aware document servers 134 and 128 are used to access a document identified in a document token when that document is stored on a file server that is not token-enabled. Examples of file services that are not token enabled include the Windows NT file service (a product of Microsoft Corporation) and the NFS (Network File System) file service.

A document token (also referred to herein as document references) is a superset of a Uniform Resource Locator (URL) because document tokens include security elements for authentication. Advantageously, document tokens may also reference documents on any standard web server operating on Intranet 116 or Internet 122. It will be appreciated by those skilled in the art, however, that a standard web server does not recognize secure token transactions, and therefore any security elements of tokens are disregarded by the standard web server. An example of a token-aware document server which supports secure token transactions is disclosed in U.S. patent application Ser. No. 09/270,320, entitled "Secure Token-Based Document Server".

If necessary, the token-aware document delivery server 138 requests that the conversion server 136 convert retrieved documents into an appropriate format. The conversion server 136 converts documents between a number of different document formats such as Microsoft Word, Postscript, and bitmap formats. Interchanging documents between various different formats is known as disclosed, for example, in U.S. Pat. No. 5,210,824.

After retrieving and formatting a document referenced by a document token, the token-aware document delivery server 138 delivers the formatted document to a driver or interface for accessing one of the document processing devices located on Intranet 116 (e.g., printer 102 or personal workstation 108). The drivers or interfaces available on the token-aware document delivery server 138 include a filing interface 146, a fax driver 148, a print driver 150, an email interface 152, or a viewing driver 156. In an alternate embodiment (not shown), the token-enabled server 126 includes a document capture server, which stores and allows access to documents received from input devices such as scanner 110 and fax server 106.

The network gateways 114 and 120, the transaction server 144, the token-aware document delivery server 138, and the token-aware document servers 134 and 128 communicate with the certificate server 140 which stores a list of public keys of users. In requesting a public key from the certificate server 140, a requesting token-enabled server submits a hint of a user's public key. In return, the certificate server 140 supplies a certificate, which contains the user's public key as well as a well-known public key that can be used to authenticate the certificate. In addition, the certificate server 140 can support standard certificates such as the X509 certificates from Verisign Incorporated.

The difference between a token-aware shared document server 134 and a token-aware personal document server 128 is that the shared document server 134 is capable of authenticating requests to fetch documents identified in document tokens using many different key pairs. In contrast, the personal document server 128 may only authenticate requests with one or two key pairs, such as a device key from the mobile computing device 118 and the personal workstation 108. Accordingly, the shared document server 134, unlike the personal document server 128, is adapted to accommodate a number of users operating on Intranet 116.

C. Token Elements on Personal Workstations

Operating on personal workstation 108 are token-enabled personal workstation elements 131, which include a document token management service 132, a token-aware document viewing service 130, and a token-aware personal document server 128. Any combination of these elements may operate on one or more personal workstations 108. The token-aware personal document server 128 provides users operating a mobile computing device 118 with access to documents stored on the particular workstation operating on networks 116 or 122. The token-aware document viewing service 130 provides users of mobile computing devices 118 with the capability of beaming document tokens to the personal workstation 108 and viewing the documents referenced by the document tokens. The document token management service 132 provides a facility for creating document tokens for documents stored, for example, on personal workstation 108 or network file server 104.

D. Token-Enabled IR and RF Gateways

The token-enabled server 126 offers a plurality of document services to users of mobile computing devices 118 through either IR gateway 114 or RF gateway 120. When the gateway 114 receives a document transaction service request from a proximately located mobile computing device 118, the IR gateway 114 forwards the request to the transaction server 144 over Intranet 116. The IR gateway can either be embedded in or be intimately associated with a device that offers document services. For example, the printer 102 shown in FIG. 1 is intimately associated with an IR gateway 114.

Before forwarding the document service request, the IR gateway context insertion sliver 115 authenticates the request using the certificate server 140 and appends context information to the request. Document service requests that arrive either from RF gateway 120 or Internet 122 are authenticated at firewall 124. Forming part of the RF gateway 120 is a dialup server for establishing connections between wire-based and wireless networks. Typically, such a dialup server establishes PPP connections with the mobile computing devices 118 and thereby provides a communication link with the token-enabled server 126 operating on network 116.

In order to establish a connection through a particular IR gateway 114, the IR port of the mobile computing device must have an unobstructed path and be within one meter of the IR gateway 114. In one embodiment when making a document service request, a mobile computing device 118 attempts to access an IR gateway 114 before attempting to access the RF gateway 120. When a mobile computing device 118 is unable to establish an IR connection, the mobile computing device 118 attempts to establish an RF connection over RF gateway 120. Thus, a user must consciously position the mobile computing device 118 proximate to an IR gateway in order to establish an IR link; otherwise by default, an RF link is established unless instructed not to by the user of the mobile computing device. To provide feedback to the user, a message of the status of attempted or established IR or RF connections is presented on a user interface of the mobile computing device.

E. Context Sensitive User Interface for Use with Document Service

E.1 Overview

Figure 2:
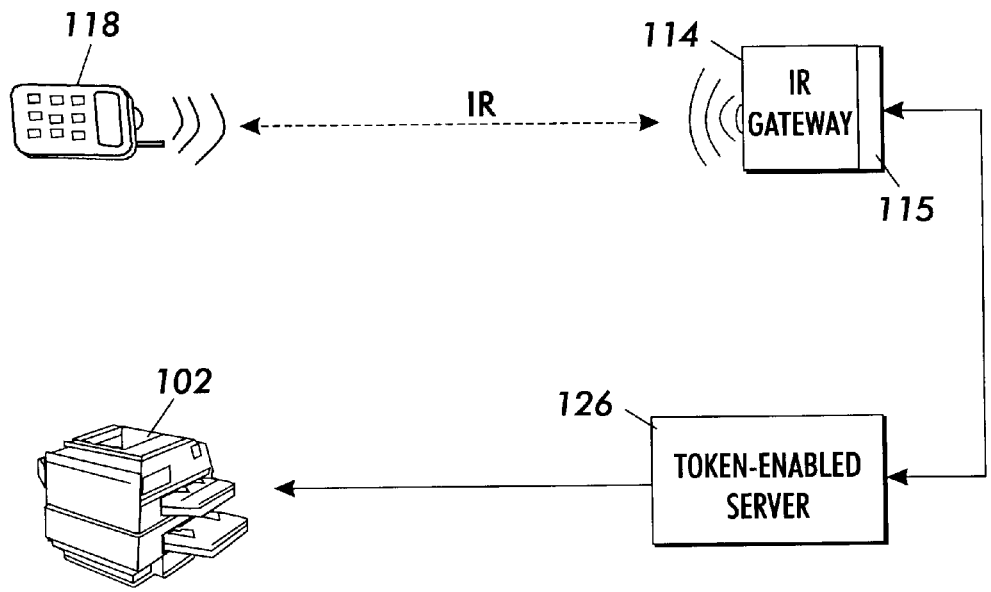
FIGS. 2 and 3 illustrate two different embodiments in which the present invention can be performed using the operating environment illustrated in FIG. 1.
Figure 3:
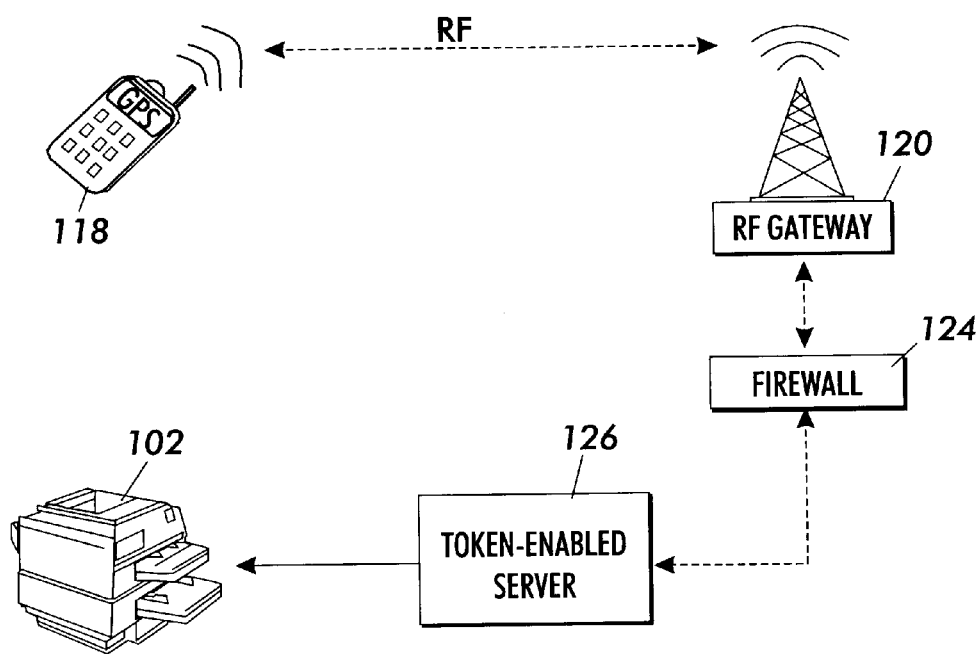

FIGS. 2 and 3 illustrate two different embodiments in which the present invention can be performed using the operating environment illustrated in FIG. 1. In FIG. 2, the mobile computing device 118 communicates with IR gateway 114. The IR gateway 114 is associated with printer 102 to provide context sensitive communications between the mobile computing device and the token-enabled server 126. In this embodiment, information appended by context insertion sliver 115 to communications made by mobile computing device 118 to token-enabled server 126 provides context to such communications. In contrast, FIG. 3 illustrates an embodiment where contextual information is obtained by the mobile computing device 118 through a location positioning system, such as a Global Positioning System (GPS) or a positioning system available in cellular phones. In this alternate embodiment, the mobile computing device receives information from the location positioning system and communicates that information directly to token-enabled server 126 through an RF communications system.

In accordance with one aspect of the present invention, a user of a mobile computing device is able to request document services based on their function and location. Queries for document services are given functional meaning by the class of document service requested (e.g., printing), while queries for document services are given contextual (i.e., location) meaning by the physical location of the user. Using both the information related to a specific class of service and the location of the user of the mobile computing device, hierarchically ordered document service menus are presented at a user interface of the mobile computing device in a command section and a reference section. The command section provides immediate access to a document service defined by the location of the user request. The reference section provides links or indirect access to other document services available on devices that are located proximate to the device offering the service identified in the command section.

E.2 Transaction Protocol and User Interface

The present invention is described below with reference to context sensitive hierarchically ordered document service menus for use with mobile computing devices that store document tokens. Advantageously, the hierarchically ordered document service menus provides a mechanism for users of mobile computing devices to readily discover available document services from the physical location at which they are positioned. Although specific reference is made to a token-to-print transaction service, it will become evident to those skilled in the art that the present invention can be implemented with other transaction services (e.g., viewer service).

Figure 4A:
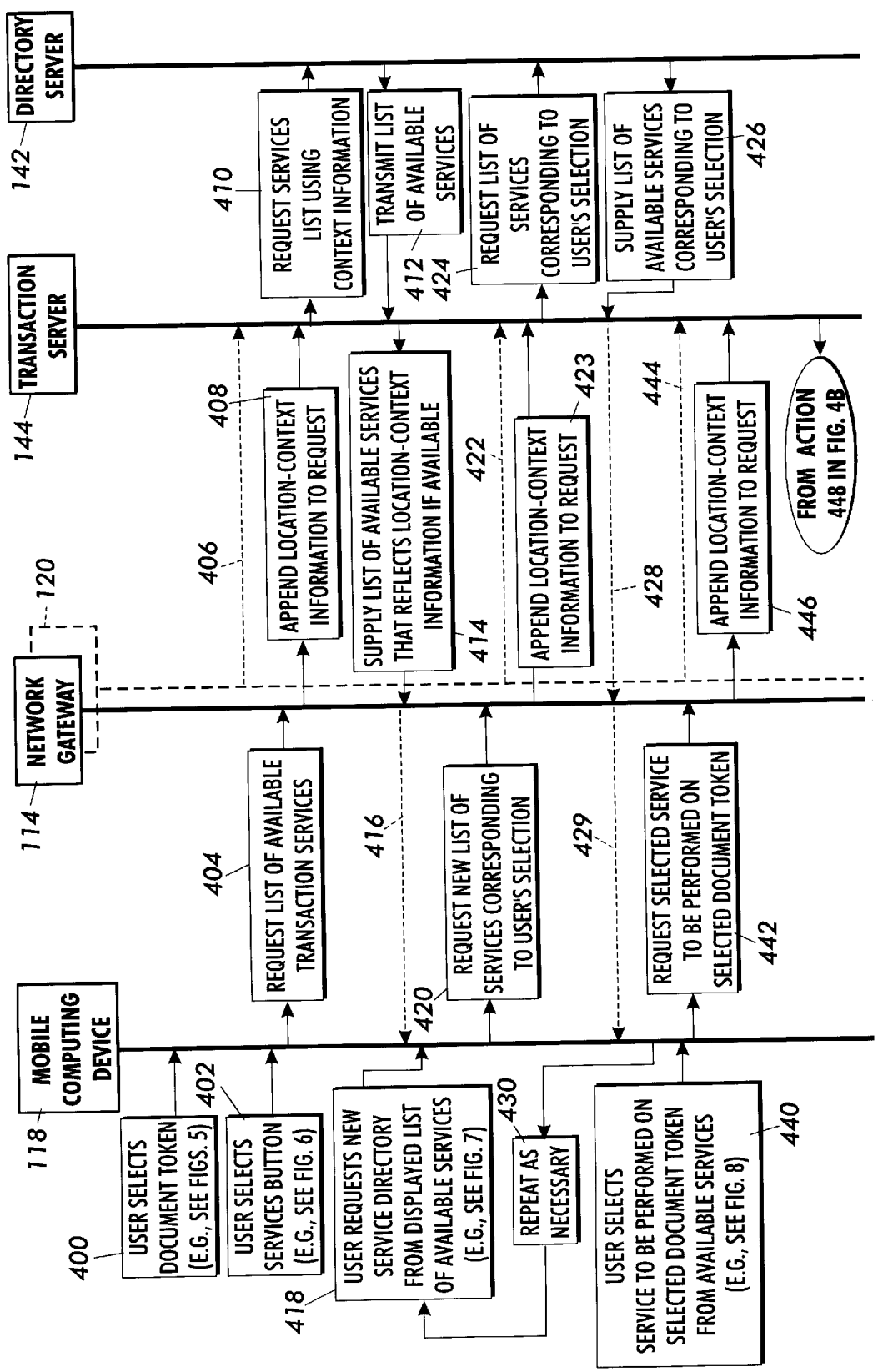
FIGS. 4A and 4B illustrates a transaction protocol for providing token-to-print service over integrated wireless and wire-based communication networks.
Figure 4B:
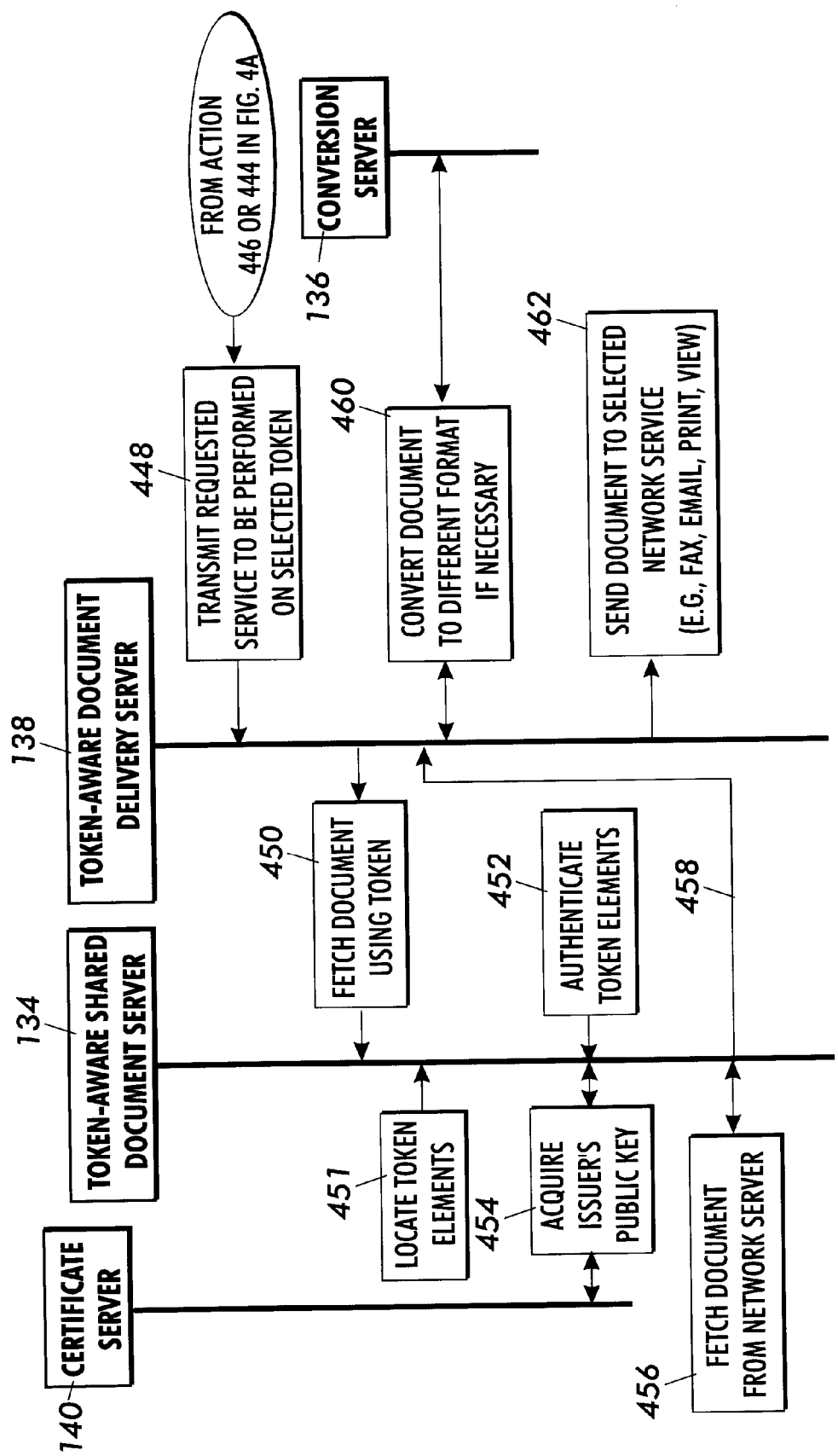

FIGS. 4A and 4B illustrate a transaction protocol for printing a document token stored on a mobile computing device using a token-to-print service that operates over an integrated wireless and wire-based communication networks. The transaction protocol defines the actions to be performed by the token-enabled servers 126 for providing the token-to-print transaction service. More specifically, in response to a print request from a mobile computing device, the token-enabled server recovers a document identified by a selected document token and directs it to be printed on a selected printer.

Figure 5:
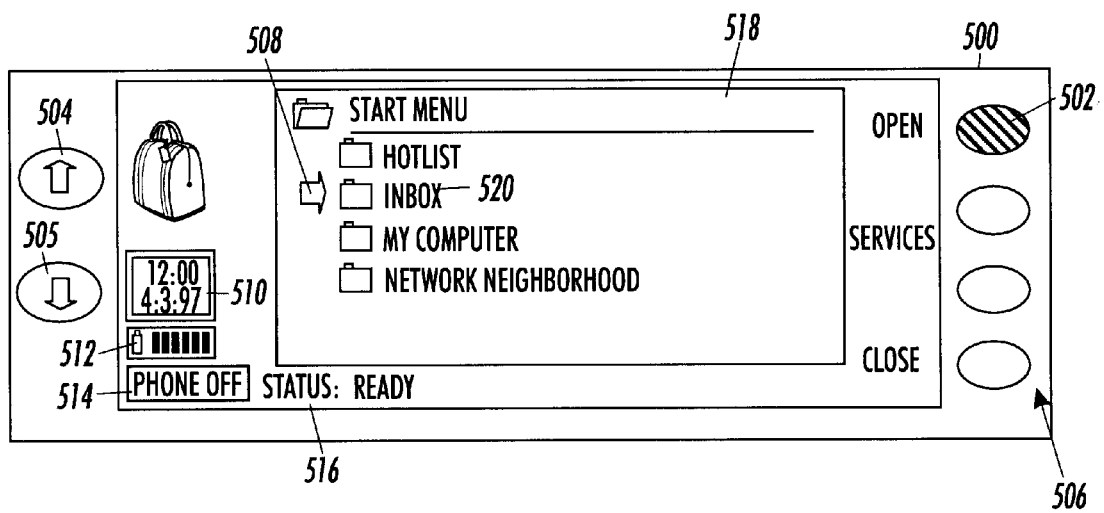
FIGS. 5–8 illustrate a user interface, which operates on a mobile computing device, for.performing the user-specified operations of the protocol set forth in FIG. 4A.

The transaction protocol for providing the token-to-print service is invoked by a user of the mobile computing device 118 by selecting a document token, as indicated by action 400. The action 400 is performed, for example, on a user interface 500 of the mobile computing device 118, which is shown in FIG. 5. More generally, FIGS. 5–8 illustrate a user interface that operates on the mobile computing devices 118 for performing user-specified operations set forth in FIG. 4A. By way of overview, the user interface 500 includes scroll buttons 504 and 505, command buttons 506, selection indicator 508, time and date indicator 510, battery power indicator 512, field strength indicator 514, and operational status indicator 516.

More specifically, the user of a mobile computing device begins the token-to-print service by selecting a document token. A document token can be selected, for example, from "Inbox" folder 520. The "Inbox" folder is accessible from the start menu screen 518 shown in FIG. 5. For simplicity, it is assumed that each document in the "Inbox" folder is a document token. Each document token consists of a reference to a document and not the contents of the document. Storing document tokens advantageously minimizes the memory requirements of the mobile computing devices 118, as well as, the bandwidth required for transmitting information from a mobile computing device to other mobile computing devices or other computing devices that are coupled to networks 116 or 122. An example of a document token is a document URL (Uniform Resource Locator) which consists of three fields: a protocol field, a field with the DNS (Domain Name System) name of a host system, and a file name field.

Figure 6:
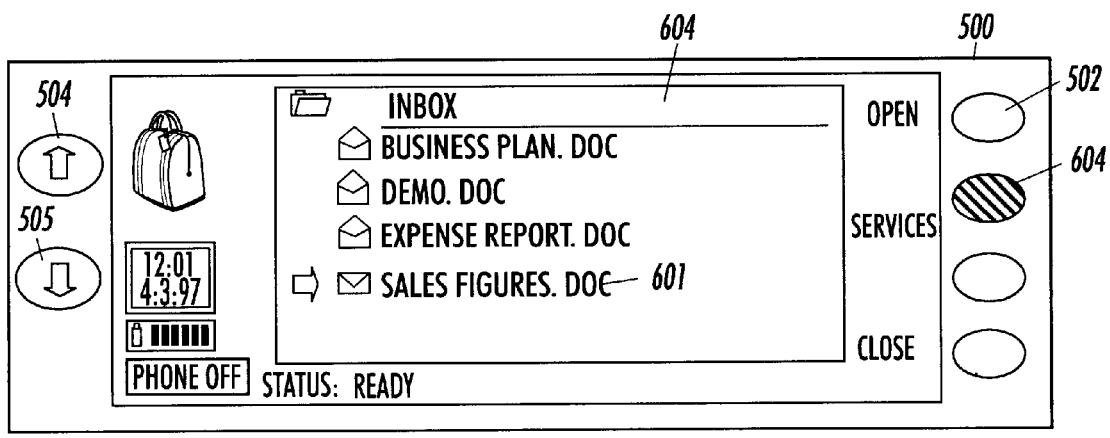

By selecting the "open" command button 502, the content of the "Inbox" folder is displayed in the display screen 604 shown in FIG. 6. Although the information for displaying the content is local to the mobile computing device, the device may automatically or in response to a command re-synch its content with the content of the user's personal workstation 108. In one embodiment, the content of the personal workstation of a user is mirrored on the display screen of the mobile computing device. Also in this embodiment, document tokens are implicitly constructed as a mobile computing device browses files and folders accessible via the token-aware document server 126. A mobile computing device implicitly constructs a token by assembling filename, host name, protocol, and security information about a document.

From the display screen 604, the user selects unopened document token message 601 shown on mobile computing device 118 using scroll buttons 504 or 505. Once the document token 601 is selected, the user then selects the "Services" button 604 as shown in FIG. 6. Otherwise, the user of the mobile computing device can select the open button 502 to review a summary of the document token. The content of a document token is set forth in detail in U.S. patent application Ser. No. 09/270,320, entitled "Secure Token-Based Document Server".

Responsive to the action 402 of selecting the "Services" button for the document selected at action 400, mobile computing device 118 transmits a request for a list of available transaction services for that user at action 404, as shown in FIG. 4A. The request is transmitted to wire-based networks 116 and 122 through either gateway 114 or 120. If the request for available services at action 404 is transmitted through one of the IR gateways 114, then a location context is appended by context insertion sliver 115 at action 408; otherwise, no context information is appended (by the embodiment shown in FIG. 2) to the request for available services action 404 at the RF gateway 120 as shown in FIG. 4A by arrow 406.

As illustrated in FIG. 1, IR gateways 114 are associated with unique document devices such as printer 102 and scanner 110. The IR gateways 114 may also be associated with a unique multifunction device (not shown) that offers a plurality of services (e.g., a print, scan, and fax service). The context insertion sliver 115 is programmed to provide the document device with a context identifier for users of mobile computing devices. The context identifier can be either an indication of a physical location or the identifier of a unique document device (e.g., printer 102). If a context identifier is defined using a physical location, the unique document device to which it corresponds can be identified in a database, or the like. Accordingly, a user who beams a request for document services to an IR gateway that is located near or is attached to a printer is automatically assigned a context by context insertion sliver 115.

In one embodiment, a context identifier is assigned both a functional component as well as a location component. The functional component identifies a class of devices or services (e.g., printer, scanner, or viewer). The location component identifies a physical location at which the document device is located (e.g., room 2 in building 3). In another embodiment, a context identifier is a unique identifier that is used to reference an entry in a database that is stored, for example, on the directory server 142. The entry in the database may include any desired information, including information about location and function of a physical device.

Transmissions from mobile computing devices 118 that are received by either gateway 114 or 120 are transmitted to an available transaction server 144. Upon receipt of a request for available services, the transaction server 144 transmits a request at action 410 using available context information provided to the directory server 142. Responsive to the request, the directory server 142 provides the transaction server 144 with a list of available document transaction services at action 412. Subsequently, the transaction server 144 transmits to the network gateway 144, at action 414, the list of available services that reflects location-context information if available. Upon receipt, the network gateways 114 and 120 communicate the information relating to available services to mobile computing device 118 at action 416.

Figure 7:
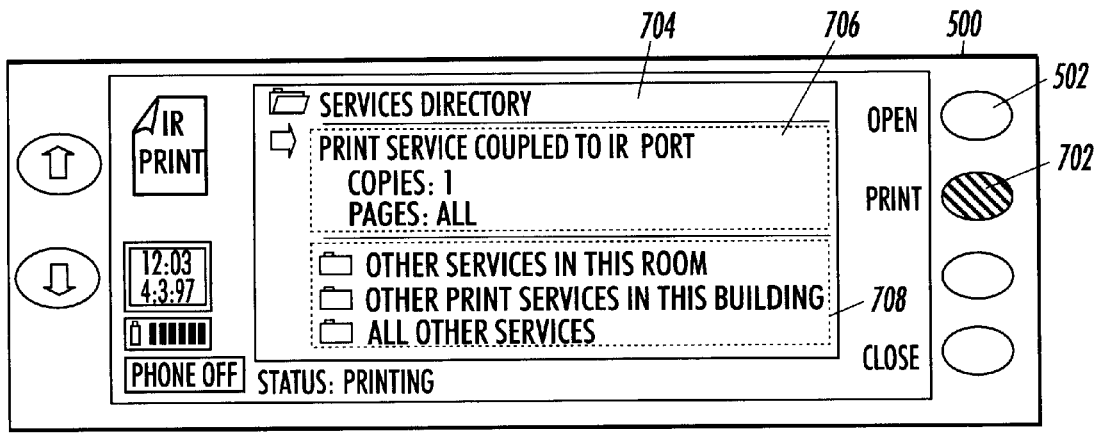

Once a list of available services is received at the mobile computing device 118, the "Services Directory" screen 704 shown in FIG. 7 is presented at user interface 500. The list of available document transaction services presented on the screen 704 is divided into two sections. The first section (or command section), which is indicated by reference number 706, identifies a document service to which the context of the IR gateway is mapped by directory server 142. The user of the mobile computing device in the first section 706 is given immediate access to invoke the service using the "print" command button 702.

Figure 8:
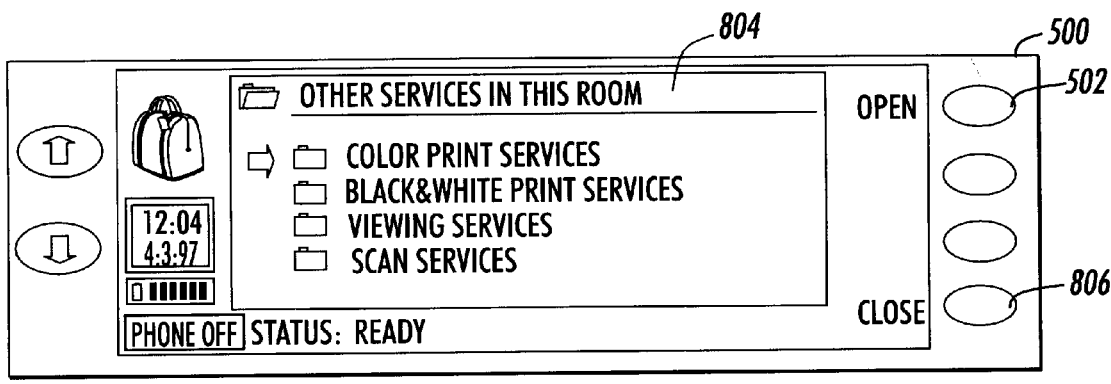

The second section (or reference section), which is indicated by reference number 708, identifies references or links to other document services available to the user of the mobile computing device. The references listed in the second section are links that are used to define hierarchical levels. As set forth below in more detail, the location-context information of services offered in the reference section is defined by their links. An example of directory services information returned after selecting the "Other Services In This Room" link and the "Open" button 502 is illustrated in FIG. 8 in display screen 804. From display screen 804 a user is able to retrieve information relating to other available document services for use with the selected document token 601 (shown in FIG. 6).

In one embodiment, the directory server or transaction server automatically generates the two sections on the screen 704 using an HTML (Hypertext Markup Language) representation of a page(s). The HTML is transmitted to the mobile computing device and used to formulate the sectioned screen on its user interface 500. The directory server 142 stores a database of context identifiers that relates document services or devices by their class, name, and location. In addition, the directory server links each document service or device to a hierarchy of device classes or services (e.g., a color printer is linked to all color printers, which is linked to all printers, which is linked to all output devices, etc.). Using this directory information, the HTML page is generated dynamically for each request for a list of available services, using for example a CGI script. In another embodiment, the HTML is transmitted to the mobile computing device in a compressed form. The compressed representation of HTML provides more efficient transmission of HTML over a wireless communication system.

Referring again to FIG. 4A, at action 418 a user requests a new services directory from a displayed list of available services. The request is made from one of a set of service directories shown in the reference section of the display screen 708. Responsive to the request, the mobile computing device 118 transmits a request to the transaction server 144 for a list of other document services available at a specified display level, at action 420. Although actions 422 and 423 are performed as set forth above for actions 406 and 408, respectively, the context information is ignored by transaction server 144. That is, once the context information is used to define the first list of available services at action 410, the context information is no longer necessary to respond to subsequent requests for available transaction services.

Upon receipt of the request for additional information of available services, the transaction server 114 requests a list of additional services from directory server 142, at action 424. Using the user's selection, a list of available services is supplied at action 426 to transaction server 144 and forwarded to network gateways 114 or 120 at action 428 and to mobile computing device 118 at action 429. At action 424, the location-context information appended to the request is ignored. Instead, the user's selection is used at action 412 to browse or index into a hierarchy organized set of services. In other words, requests for lists of services at action 424 do not require context information because an initial request for services made at action 410 defines an initial entry point into the hierarchy (or web) of services. That is, a context is defined by the user's selection at action 418, and not by the physical location of a document service. At action 430, action 418 is repeated as necessary until a specific service is invoked or the service request is canceled as a consequence of the user of the mobile computing device selecting close button 806. In an alternate embodiment (not shown), the lists for available services are cached at the mobile computing device in a memory (not shown).

Alternatively, after being presented with display screen 704, a user may decide to select the print command button 702 to invoke the print service available in the command section 701 at user action 440. In the example shown in FIG. 7, the user selected the print service 701 that is coupled to the IR port to which the mobile computing device is communicating directly with. Responsive to selection of command button 702, mobile computing device 118 returns to either display screens 518 or 604, which are shown in FIGS. 5 and 6 respectively. A user of the mobile computing device 118 can retrieve progress of any document transaction service requested by opening a service request status log (not shown).

At action 442, the mobile computing device 118 transmits the request specified by the user in display screen 704 (shown in FIG. 7). Upon receipt of the service request, the IR network gateway 114 appends location-context information at action 446 (while the RF gateway 120 does not append context information at action 444) before transmitting the received service request to the transaction server 144. Subsequently at action 448 shown in FIG. 4B, the transaction server 144 transmits the service request for performing the token-to-print service on the selected document token 704 to the token-aware document delivery server 138. At action 450, the token-aware document delivery server 138 requests that the document identified by the selected document token 704 be fetched from a token-aware document server, which in this example is the token-aware shared document server 134.

Initially at action 431, the token-aware shared document server 134 locates elements of the token that are received from the token-aware document delivery server 138. The token elements that are located at action 431 include for example a document URL that identifies the name and location of a document. The token-aware shared document server 134 then authenticates document token at action 432. Part of the process of authenticating the document token is performing action 434 for acquiring the public key of the original user issuing the document token. Further details for authenticating elements of the token are disclosed in U.S. patent application Ser. No. 09/270,320, entitled "Secure Token-Based Document Server". Although not shown in FIG. 4A or 4B, authentication of the document token can be performed at network gateways 114 and 120, the transaction server 144, and the token-aware personal document server 128.

After authenticating the token, the token-aware shared document server 134 fetches the document from its physical location on the network file server 104 or the like, at action 456. The fetched document is then forwarded to the token-aware document delivery server 138 at action 458. If necessary, the token-aware document delivery server 138 performs action 460 to convert the document acquired from the token-aware shared document server 134 into a format specified either by the sender or the selected print service using the conversion server 136. Finally, to complete the actions performed by the token-enabled servers 126 in performing the token-to-print transaction service, the document delivery server sends the document acquired by the token-aware shared document server 134 to the specified printer 102. It will be appreciated by those skilled in the art that the document retrieved at action 462 is either printed, faxed, emailed, or viewed depending on the service selected at step 402. In the event the document is faxed, the fax driver 148 transmits the document retrieved by the token-aware shared document server 134 over a telephone network (not shown) to a predefined phone number.

E.3 Other Examples of Context-Sensitive Hierarchically Ordered Service Menus

As set forth above, the user interface illustrated in FIGS. 5–8 provides users of mobile computing devices with fast and easy access to document devices and services, which are proximately located to the physical position of the user. In addition, the user interface provides links for access to browse other available devices and services. As illustrated for the token-to-print service set forth above, a request for available services made through an IR gateway coupled to a device (e.g., printer) is assigned a context identifier. The context identifier is used to define a specific device to which the IR gateway is coupled, as well as, other available services and devices that are proximate to the specific device.

FIGS. 9–12 illustrate different sequences of display screens for use with the user interface 500 shown in FIG. 5. Each display screen is defined using HTML. The first display screen 902 in each of the FIGS. 9–12 identify several document tokens 904. One of the document tokens 905 is selected in each of the FIGS. 9–12 to be input to one of the available document services set forth in the initial response for available services. As set forth above, in response to a request for a list of available services (e.g., selecting "Services" button 908) to be applied to the selected document token 905, the two section display screen 920 is presented to the user of the mobile computing device.

Figure 9:
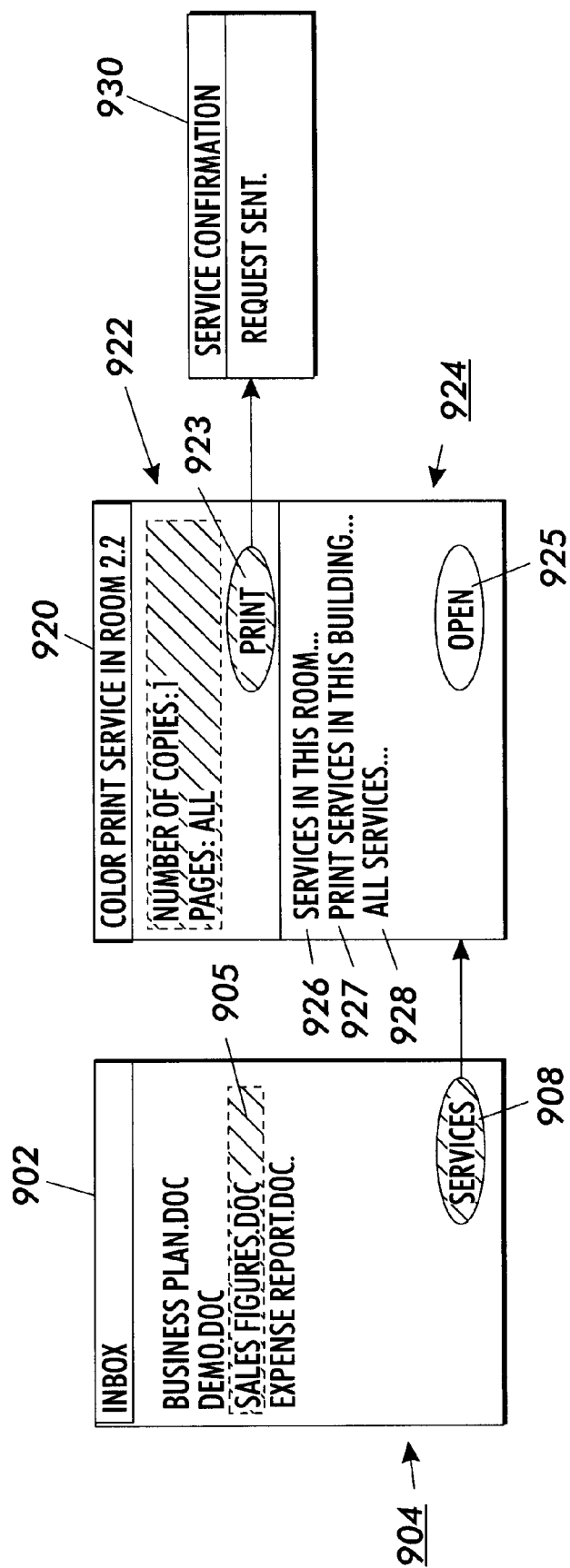
FIGS. 9–12 illustrate different sequences of display screens for use with the user interface shown in FIG. 5.

The two-section display screen 920 specifies a "home page" for a particular document service (e.g., printer). The service "home page" 920 sets forth access to the device to which the home page belongs, and links to other nearby places and services. Specifically, the first section 922 (or command section) of the display screen 920 includes an active command button for immediately applying the service to the selected document token. As illustrated in FIG. 9, once the "Print" command button 923 is selected, a service confirmation request screen 930 is displayed to the user at the mobile computing device.

Figure 10:
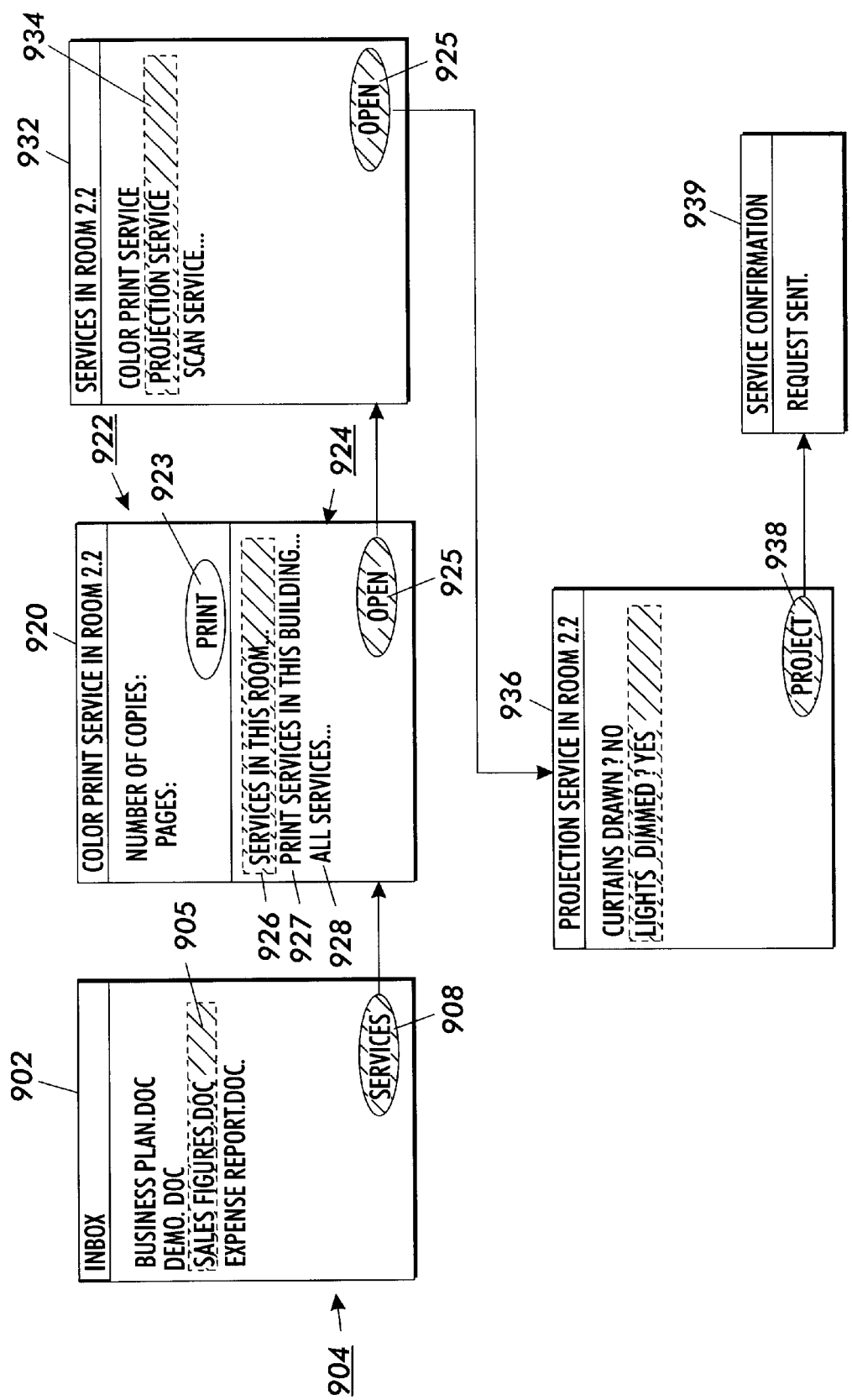
Figure 11:
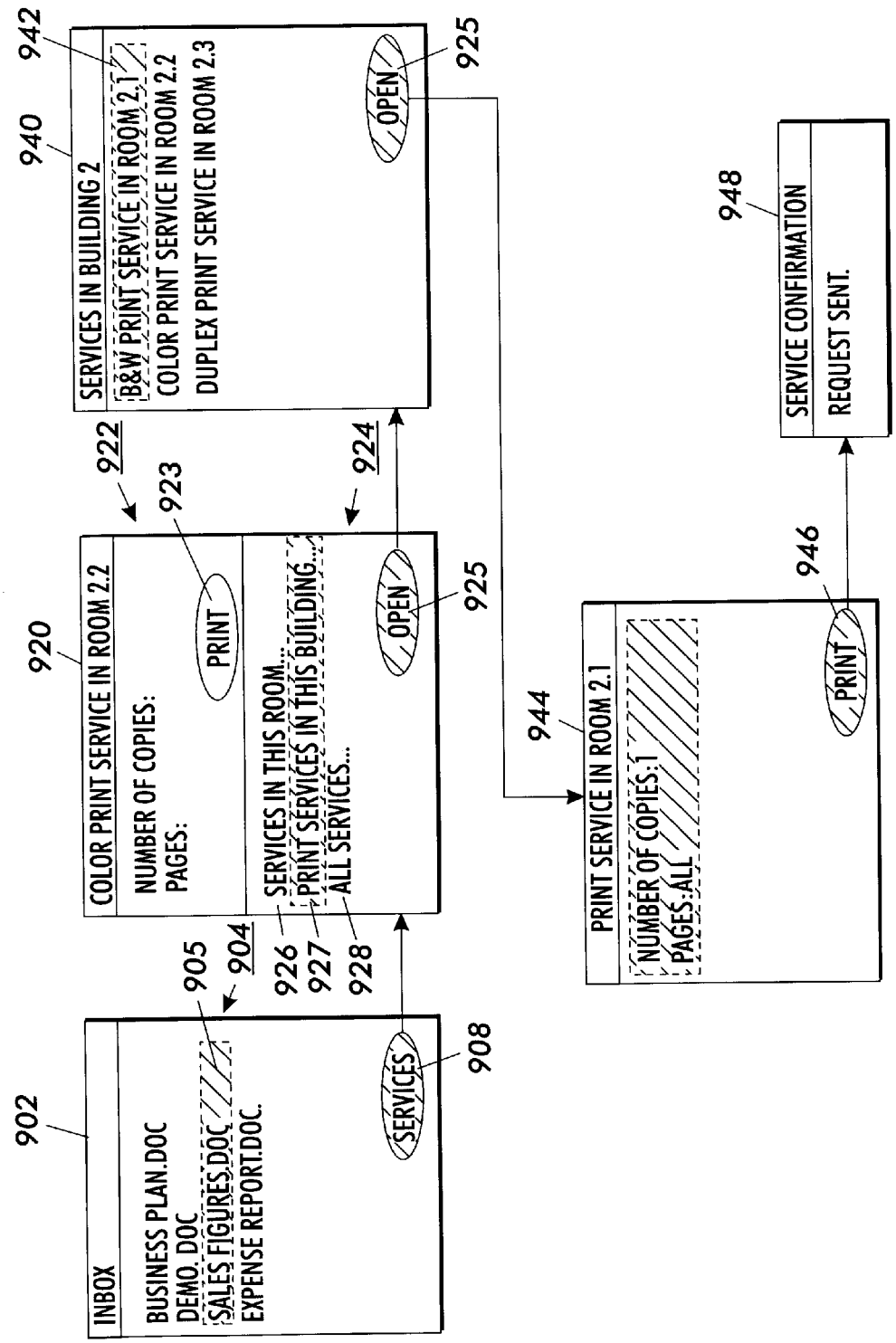
Figure 12:
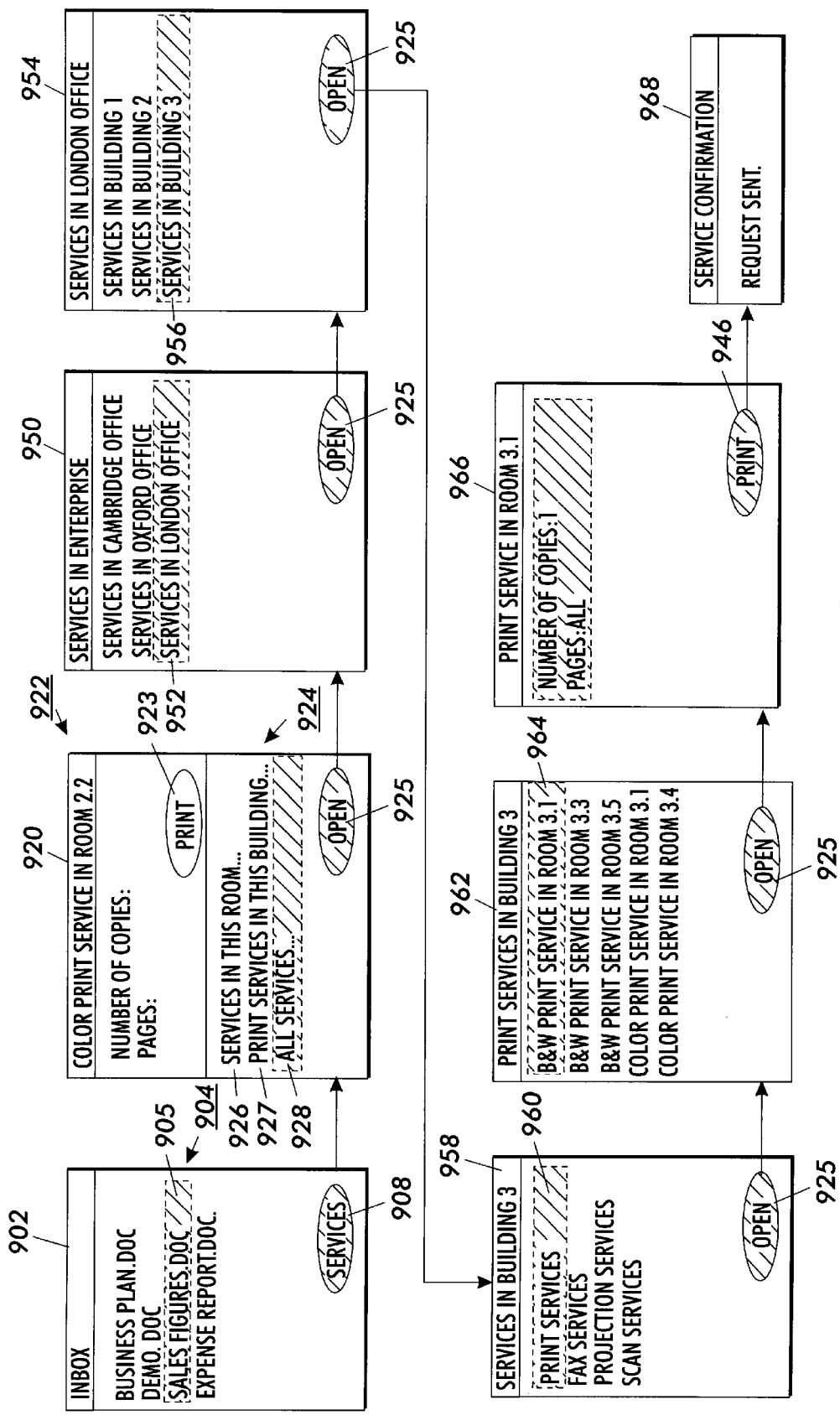

FIGS. 10–12 illustrate how the reference section 924 of the display screen 920 provides a hierarchically ordered list of available services-that is organized by function and/or location. More specifically, FIG. 10 is an example of other available services in Room 2.2, which is indicated by menu selection 926. FIG. 11 is an example of other print services available in the building of Room 2.2, which is indicated by menu selection 927. FIG. 12 is an example of a "yellow pages" service finder (i.e., all available services) which is indicated by menu selection 928. These three links in reference section 924 illustrate different ways that information of document services can be ordered as a function of class of service and/or location of service.

FIG. 10 illustrates a sequence of display screens for offering available classes of service in a specific location (e.g., "this room"). In FIG. 10, the user of the mobile computing device selects the menu selection 926 and the "Open" command button 925 located in the second section 924 of the display screen 920 to access a list of references to other document services in Room 2.2. Responsive to the request, display screen 932 is generated. In this example, the user selects the projection service 934, which is one of three available document services in Room 2.2. After selecting the open button 925 for access to the projection service 934, a command screen 936 is presented to the user. The command screen 936, similar to the command section 922 provides immediate access to apply the selected document token "sales figures.doc" 905 to the document service 934 by selecting the project button 938. To provide feedback to the user after selecting the project button 938, a service confirmation screen 939 is presented.

FIG. 11 illustrates a sequence of display screens for offering a specific class of service (e.g., printing) in a limited location (e.g., "this building"). More specifically in FIG. 11, after a user selects the reference link 927 and the open command 925 in the display screen 920, the display screen 940 is presented to the user, which includes a list of other available print services and the rooms in which they are physically located. After selecting a print service 942 from the list of available print services in the building, display screen 944 is presented to the user. The display screen 944 is a command screen for invoking the selected print service 942. After selecting the "Print" command button 946 on command screen 944, a service confirmation screen 948 is presented to the user.

FIG. 12 illustrates a sequence of display screens for offering a generalized type of "yellow-pages" directory of document services. The yellow pages directory of services lists all services that the token-enabled server 126 is aware of irrespective of class or location. Such a directory of services can extend across the firewall 124 and the Internet 122 to define collaborative organizations. Accordingly, after selecting the "All services" reference 928 in display screen 920, the display screen 950 is presented to the user of a mobile computing device. The display screen 920 includes references to lists of services available by location. After selecting region of service indicated by reference number 952, the services in particular buildings in that region are presented to the user at display screen 954. After identifying a particular building 956 in region 952, classes of services are presented at display screen 958. Upon selecting one of the classes (e.g., printing 960) of service in the building identified at display screen 954, the available devices operating in that building are presented at display screen 962. After identifying a particular device 964 in display screen 962, print command screen 966 is presented to the user. After the user selects the "Print" command button 946 on command screen 966, the user is presented with confirmation screen 968.

FIGS. 9–13 illustrate one embodiment for presenting hierarchically ordered contextual sensitive sequences of display screens. In alternate embodiments, the hierarchical ordering of services made available on the display screens is defined using the attributes of different services. In other words, distinguishing factors between devices are used in this alternate embodiment to organize lists of available services. For example, print services can be organized by printer attributes, such as paper size, print quality, printing cost, and print speed.

Figure 13:
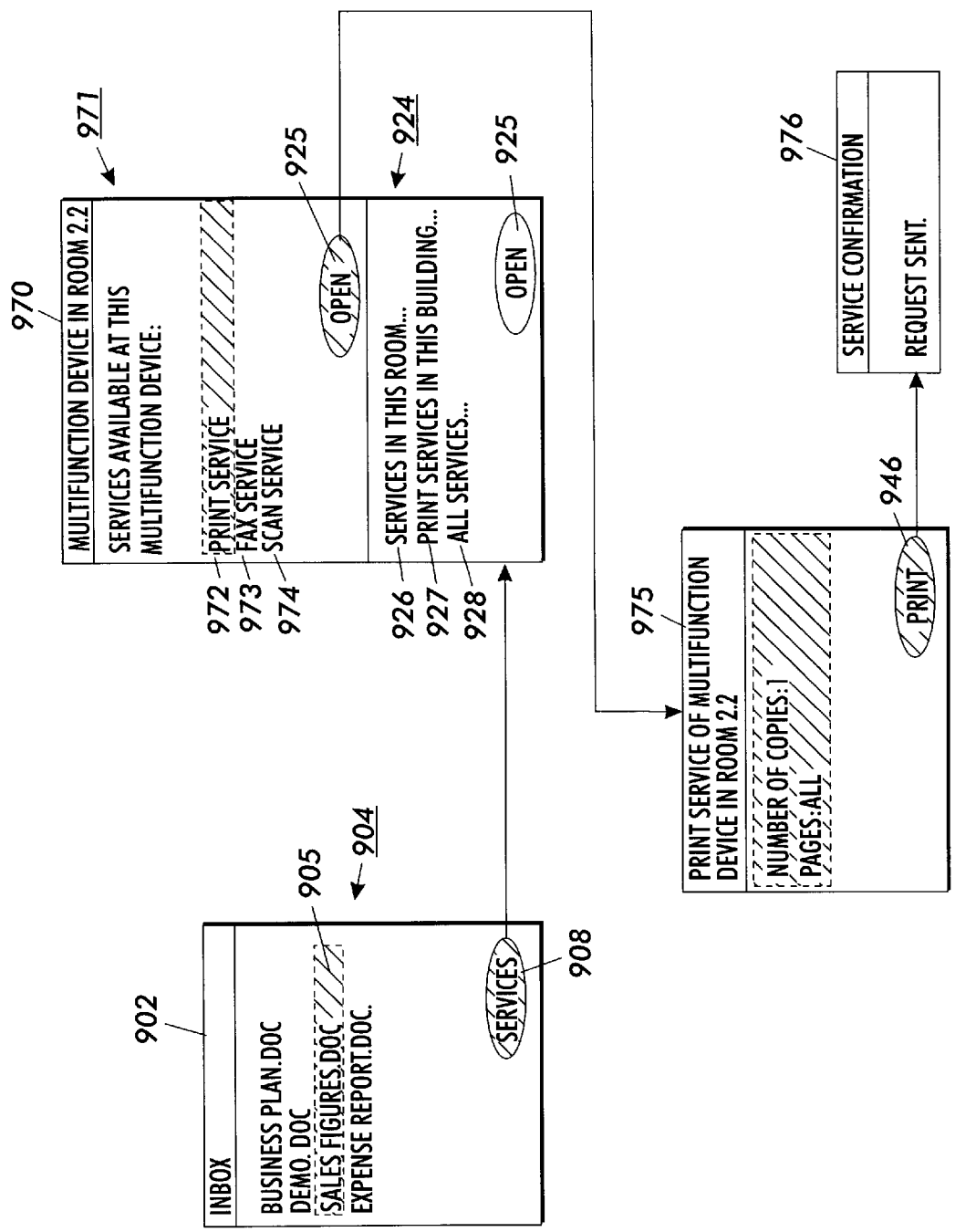
FIG. 13 illustrates a sequence of display screens for use with a multifunction device.

FIG. 13 illustrates a sequence of display screens for use with a multifunction device (not shown) that is context-enabled. That is, communication between a mobile computing device 118 and the token-enabled server 126 through an IR gateway 114 coupled to the multifunctional device is context sensitive. The first display screen 902 presented to a user of a mobile computing device 118 is the similar to the display screen presented to a user who is communicating with a single function device that is context enabled (e.g., printer 102 shown in FIG. 1). However, unlike a single function device, a display screen 970 is presented to a user of the mobile computing device 118 in response to a request for a list of available services (e.g., the selection of "Services" button 908).

The display screen 970, unlike display screen 920 shown in FIGS. 9–12, includes a first section 971 that identifies a list of available services at the multifunctional device to which the service request is directed. In this example, the multifunctional device operates a print service 972, a fax service 973, and a scan service 974. Similar to display screen 920, display screen 970 includes a second section 924 that contains a hierarchically organized list of available services that is organized by function and/or location. In the example shown in FIG. 13, command screen 975 is presented to a user of the mobile computing device when the print service 972 is selected using open button 925 in the display screen 970. In an alternate embodiment, the print command is automatically invoked upon selecting the open button 925 in the first section 971 of display screen 970. In this alternate embodiment, the user of the mobile computing device presets parameters shown in command screen 975 before invoking the services button 908. Finally, after selecting the "Print" command button 946 on command screen 975, a service confirmation screen 976 is presented to the user of the mobile computing device.

F. Summary

To recapitulate, the present invention provides a user interface facility for operating on mobile computing devices. The user interface facility provides fast and easy access to local document services for users of mobile computing devices. Advantageously, the user interface provides users of the mobile computing devices with context based access to local document services when in unfamiliar surroundings. The user interface that is initially presented (i.e., device home page) to a user of the mobile computing device is one which provides access to document services that are ordered by proximity to the physical location of the user. The most proximate document service is made immediately available to the user in a command section of the display screen. Other less proximate document services are accessible to the user by navigating through a hierarchically ordered list of document services in a reference section of the display screen.

It will be appreciated by those skilled in the art that changes in behavior due to context need not be limited to different communication media (e.g., the difference between RF and IR). Instead, behavioral changes due to context can be specified using any communication media that allows the location of a device to be determined. (For example, short-range communications using a particular RF technology can have the same properties as IR communications media.)

It will also be appreciated by those skilled in the art that the device home page could be accessed through a corporate internet site displaying a list of available services on its networks. Thus, it is not necessary that every aspect of the present invention be performed using a wireless communications system. Instead, any group of services integrated using a network can be used to perform the present invention. In this alternate embodiment of the invention, document services would not be invoked using a mobile computing device. Instead, the hierarchically ordered list of document services that defines a user interface having a dual level function would be accessed using any user interface (e.g., a web browser) coupled to the wire-based network. The dual level function is communicated to a user through two separate sections in the user interface. The first or command section of a display screen provides immediate access to a selected device. The second or reference section of the display screen provides access to alternate and/or related devices physically proximate to the selected device.

It will be further appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for operating a token-enabled server recording a database of document tokens, the token-enabled server being coupled to a network of file servers for storing the documents referenced by the document tokens, each document token identifying a location of a document stored on the network, said method comprising the steps of:

receiving, from a mobile computing device, a request for available document services for performing with document tokens;

receiving, with the request for available document services received from the mobile computing device, a context identifier for providing an indication of physical location; the context identifier specifying a physical location from which the request for document services is transmitted by the mobile computing device;

developing a hierarchically ordered list of available document services using the context identifier; the context identifier being associated with a unique document device coupled to the network; the hierarchically ordered list providing two levels of access to document services available for document tokens; the first level of access providing immediate access to perform a document service available at the unique document device; the second level of access providing indirect access to additional document services that are available at other document devices; and transmitting the hierarchically ordered list of available document services to the mobile computing device.

2. The method according to claim 1, wherein said transmitting step transmits the hierarchically ordered list for display on a user interface of the mobile computing device; the user interface of the mobile computing device having a command section for displaying the first level of access and a reference section for displaying the second level of access.

3. The method according to claim 2, further comprising the steps of:

receiving a second request for available document services; the second request specifying a service identified in the reference section displayed at the user interface of the mobile computing device;

developing a second hierarchically ordered list of available document services responsive to receiving the second request for available document services; and transmitting the second hierarchically ordered list of available document services for display on the user interface of the mobile computing device.

4. The method according to claim 1, wherein said developing step arranges the hierarchically ordered list by black and white print services and color print services.

5. The method according to claim 1, wherein said developing step arranges the hierarchically ordered list by printers and viewers.

6. The method according to claim 1, wherein said receiving step is performed when the communications gateway is coupled to a document print service.

7. The method according to claim 1, wherein said receiving step is performed when the communications gateway is coupled to a workstation for viewing documents.

8. The method according to claim 1, further comprising the step of receiving, from the mobile computing device, a request to print a selected document token using the document service available at the unique document device.

9. The method according to claim 1, further comprising the step of storing, on the document token sever, a database relating document services by name, class, and location.

10. The method according to claim 9, further comprising the step of linking the database relating document services by name, class, and location with a hierarchy of device classes.

11. The method according to claim 1, wherein said receiving step is performed by communicating the request over a wireless communication system that couples the mobile computing device with the network.

12. The method according to claim 1, wherein said developing step arranges the hierarchically ordered list according to attributes of a device.

13. The method according to claim 1, wherein said transmitting step transmits a hierarchically ordered list of available services that only includes the second level of access.

14. The method according to claim 1, wherein said developing step develops the hierarchically ordered list using a hypertext markup language.

15. The method according to claim 1, wherein said second receiving step appends the context identifier to the request for available document services after the context identifier is intercepted by a communications gateway bridging the mobile computing device with the network.

16. The method according to claim 1, wherein said second receiving step appends the context identifier to the request for available document services using a location positioning system.

17. The method according to claim 1, wherein said developing step orders the second level of access to document services available for document tokens by class and location.

18. A token-enabled server for recording a database of document tokens, the token-enabled server being coupled to a network of file servers for storing the documents referenced by the document tokens, each document token identifying a location of a document stored on the network, said token-enabled server comprising:

means for receiving, from a mobile computing device, a request for available document services for performing with document tokens;

means for receiving, with the request for available document services received from the mobile computing device, a context identifier for providing an indication of physical location; the context identifier specifying a physical location from which the request for document services is transmitted by the mobile computing device;

means for developing a hierarchically ordered list of available document services using the context identifier; the context identifier being associated with a unique document device coupled to the network; the hierarchically ordered list providing two levels of access to document services available for document tokens; the first level of access providing immediate access to perform a document service available at the unique document device; the second level of access providing indirect access to additional document services that are available at other document devices; and means for transmitting the hierarchically ordered list of available document services to the mobile computing device.

19. The token-enabled server according to claim 18, further comprising means for transmitting the hierarchically ordered list for display on a user interface of the mobile computing device; the user interface having a command section for displaying the first level of access and a reference section for displaying the second level of access.

20. The token-enabled server according to claim 18, wherein the context identifier is appended to the request for available document services after being intercepted by a communications gateway bridging the mobile computing device with the network.

* * * * *